(12) United States Patent
Graser et al.

(10) Patent No.: US 8,245,246 B2
(45) Date of Patent: Aug. 14, 2012

(54) METHOD, SYSTEM, AND COMPUTER PROGRAM PRODUCT FOR IMPLEMENTING A WEB SERVICE INTERFACE

(75) Inventors: Thomas Graser, Leonberg (DE); Martin Reitz, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 12/206,869

(22) Filed: Sep. 9, 2008

(65) Prior Publication Data

US 2010/0077410 A1 Mar. 25, 2010

(51) Int. Cl.
- G06F 3/00 (2006.01)
- G06F 9/44 (2006.01)
- G06F 9/46 (2006.01)
- G06F 13/00 (2006.01)

(52) U.S. Cl. .......................... 719/330; 719/316; 707/626

(58) Field of Classification Search .................. 719/320, 719/330, 316; 707/10, 999.203, 999.01, 707/626, 694

See application file for complete search history.

(56) References Cited

U.S. PATENT DOCUMENTS

| | | | | |
|---|---|---|---|---|
| 7,716,180 B2 * | 5/2010 | Vermeulen et al. | ........... | 707/626 |
| 2004/0006653 A1 * | 1/2004 | Kamen et al. | ................. | 709/330 |
| 2007/0118844 A1 | 5/2007 | Huang et al. | | |
| 2007/0255717 A1 * | 11/2007 | Baikov et al. | ................. | 707/10 |
| 2008/0154981 A1 * | 6/2008 | Bezukov | ....................... | 707/203 |

* cited by examiner

Primary Examiner — Diem Cao
(74) Attorney, Agent, or Firm — Cantor Colburn LLP; John Flynn

(57) ABSTRACT

A method for using WebServices as a basis for implementing an application programming interface (API) of a high-level programming language between a service application and a client application is disclosed. Function parameters of an API function call represent a complex object structure (COS). The method includes serializing the COS into serialized payload data, encoding the serialized payload data to form a payload string that does not contain any XML-specific characters, and specifying the parameters of the API call in parts of an input message of a corresponding operation in a WSDL document. The method also includes transporting the payload string within the input message to the service application, decoding the payload string to yield the serialized payload data, and deserializing the serialized payload data to restore the COS representing the parameters of the API call. A system and computer program product for implementing the API on the basis of Web Services are also disclosed.

18 Claims, 3 Drawing Sheets

US 8,245,246 B2

METHOD, SYSTEM, AND COMPUTER PROGRAM PRODUCT FOR IMPLEMENTING A WEB SERVICE INTERFACE

BACKGROUND

The present invention relates to Web Services, and more specifically, to a method and system for providing an API that relies on Web Services and that hides the management of complex data structures from the Web Service interface.

Web Services are becoming increasingly popular for use in application programming interfaces (APIs). For example, a Web Service may be implemented by a system that includes clients and servers that communicate among one another using eXtensible Markup Language (XML) and which Service offers a machine-readable description of the operations written in Web Services Description Language (WSDL). Java™ XML is but one example of an API for a Java™ application and is used in XML processing.

When passing complex input or output parameters (e.g., lists of application-specific objects) in Java™-based Web Service operations, these parameters are typically modeled as "complex types" in the associated WSDL file. The creation of such complex types can be a troublesome manual process since typically the data to be transported are already coded as large Java™ classes that are not applicable to tools-based WSDL complex type creation.

Moreover, a Web Service client and a Web Service provider (server) need to be operating at the same version level of the Web Service. In other words, if the complex type changes in the WSDL, both client and provider need to be upgraded to the most current Web Service version before they are able to interoperate again.

What is needed, therefore, is a more efficient way to manage complex types in a Web Service.

SUMMARY

According to one embodiment of the present invention, a method for using a Web Service as a basis for implementing an application programming interface (API) for a high-level programming language between a service application and a client application is disclosed, whereby function parameters of an API function call represent a complex object structure (COS) of the high-level programming language used by the API. The method includes serializing the COS into serialized payload data, encoding the serialized payload data to form a payload string that does not contain any XML-specific characters, and specifying the function parameters of the API function as a Web Service operation whereby the function parameters are specified in parts of an input message of a corresponding operation in a WSDL document. The method also includes transporting the payload string within the input message to the service application, decoding the payload string to yield the serialized payload data, and deserializing the serialized payload data to restore the COS representing the function parameters of the API function call. A system and computer program product for implementing the Web Service API are also disclosed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An exemplary embodiment of the invention provides a method, system, and computer program product for implementing a Web Service interface that manages complex types (also referred to herein as "complex object structures" and "complex data structures") transported between a client application and a provider (or service) application. The Web Service interface (also referred to herein as 'application programming interface (API)) utilizes string objects in lieu of Web Service Description Language (WSDL) complex types, as both input and output parameters in a Web Service. The string objects contain serialized objects that are properly encoded as payload XML such that the parameter data does not interfere with the XML structure of the Web Service itself. In an exemplary embodiment, the Web Service interface is an entry point to an existing software application (e.g., Java™ application), and serves as an API to be used with other software products.

Figure 1:
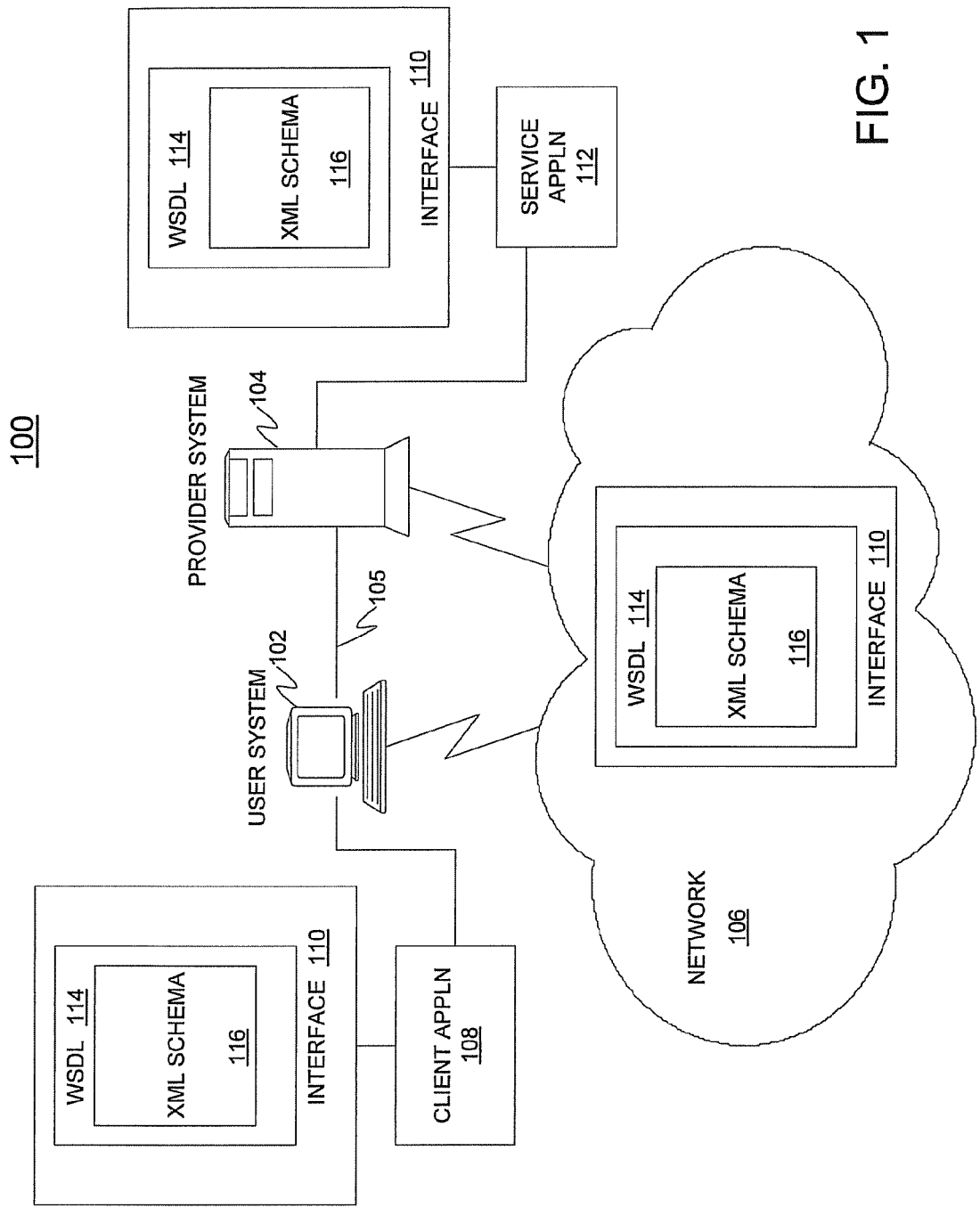
FIG. 1 is a block diagram of a system upon which Web Service interface processes may be implemented in an exemplary embodiment.

With reference now to FIG. 1, a block diagram of a system 100 for implementing the Web Service interface processes will now be described in an exemplary embodiment. The system 100 of FIG. 1 includes a user system 102 (also referred to herein as 'client system') in communication with a provider, or host, system 104. The user system 102 may be in communication with the provider system 104 directly 105 (e.g., using various cabling) or via a network 106 (e.g., a local area network, Internet, etc.). The user system 102 may be, e.g., a general-purpose computer system such as a desktop. The provider system 104 may be a high-powered computer processing system (e.g., mainframe computer) for handling a large volume of activities conducted with one or more user systems. Alternatively, the user system 102 may be physically and logically integrated with the host system 104 as a single computer processing system. In this latter embodiment, the direct connection 105 and/or network 106 may not be required.

The user system 102 may execute one or more software applications that use a portion of the Web Service interface processes. In an exemplary embodiment, the user system 102 is executing a client application 108 (e.g., a Java™ application). A Web Service interface 110 is used by the application 108 in order to communicate with a service application 112 (which is running on the provider system 104).

The provider system 104 may implement a variety of software applications for providing Web Services to client applications (e.g., the client application 108 running on user system 102). In an exemplary embodiment, the provider system 104 executes the service application 112. The Web Service interface 110 may be considered as an application programming interface (API) to the service application 112 and other software products executing on the provider system 104. In an exemplary embodiment, the interface 110 uses a high-level programming language (e.g., Java™), as described herein.

The interface 110 includes a Web Services Description Language (WSDL) 114 that contains a XML schema 116. The XML schema 116 describes the data structures (format) of the information that is passed between the client application 108 and the service application 112, as will be described further herein.

Figure 2:
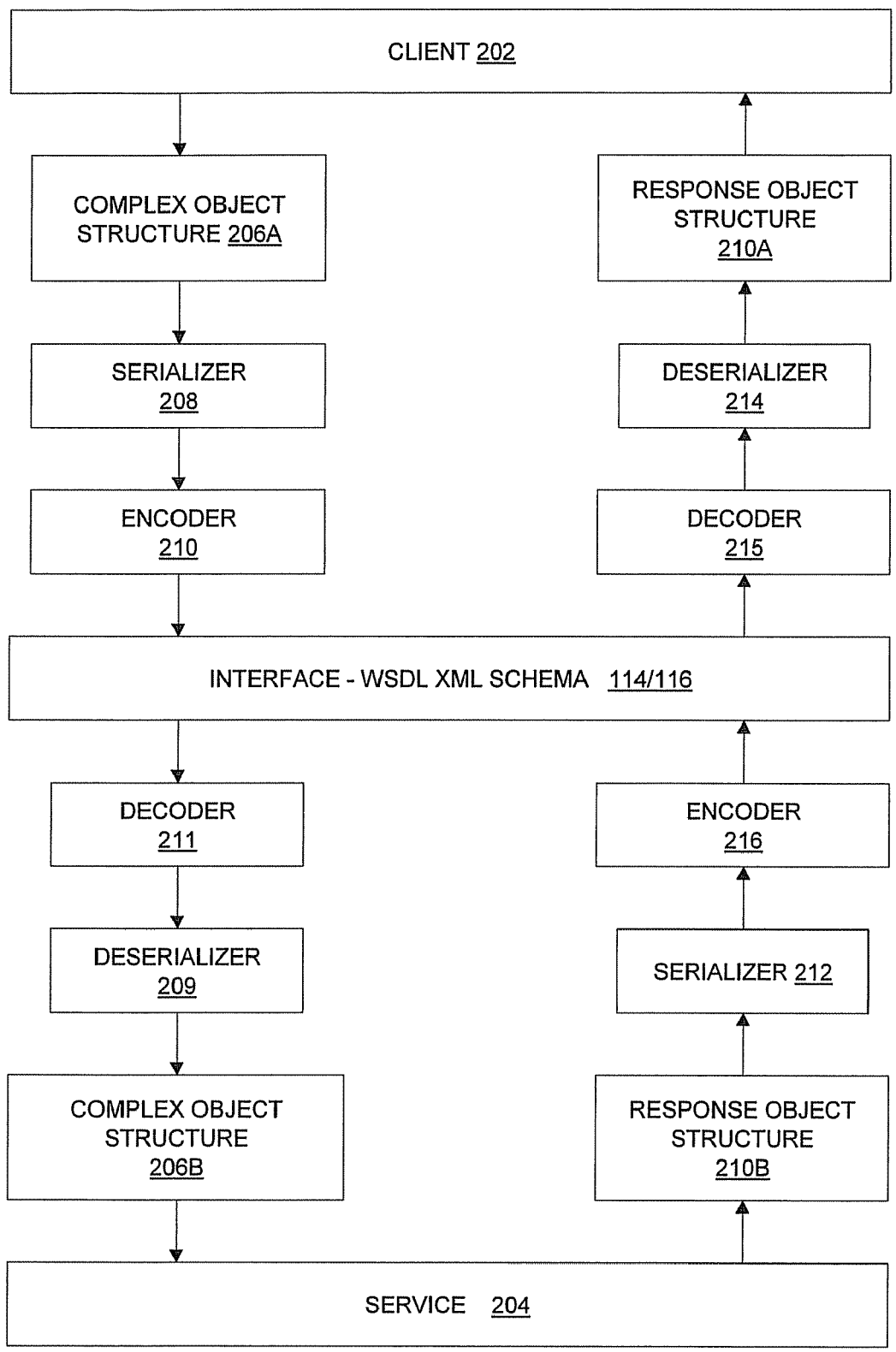
FIG. 2 is a component-level diagram of the system of FIG. 1 illustrating the architecture of the Web Service interface in an exemplary embodiment.

Turning now to FIG. 2, a component-level diagram of the system of FIG. 1, including the Web Service interface architecture and related functions, will now be described in an exemplary embodiment. The diagram in FIG. 2 includes a client 202 and service 204. The client 202 represents the client application 108 (e.g., Java™ application) executing on the user system 102. The client 202 includes various elements or components for processing information. For example, the client 202 creates and receives complex object structures, such as complex object structures 206A and 210A, respectively. If the application 108 is a Java™ application, the complex object structures 206A and 210A may be Java Beans (Java Beans object structures). The client 202 also includes a serializer 208 and a deserializer 214.

The service 204 represents the application (e.g., service application 112) executing on the provider system 104. The service 204 also includes a serializer 212 and a deserializer 209. The serializers 208/212 and deserializers 214/209 may be generic, i.e., independent of the internal structure of the complex object structures 206A/210B and 206B/210A, respectively. For example, Java™ provides a generic Java Beans encoder (which is, in fact, a Java Beans serializer) that may be used to serialize Java Beans objects to a specific XML representation, and Java™ provides a generic Java Beans decoder (which is, in fact, a Java Beans deserializer) that may be used to deserialize the specific XML representation back to the original Java Bean objects.

The complex object structure 206A/206B represents an object passed as Web Service function parameters to the provider system 104 (more precisely, to the service 204) from the user system 102 (more precisely, from the client 202) in response to an API function call by the client application 108. More specifically, complex object structure 206A represents the object prior to a serialization operation performed by the serializer 208 on the user system 102, while the complex object structure 206B reflects the complex object structure 206A after it has been through a deserialization operation by the deserializer 209 on the provider system 104.

Likewise, complex object structures 210A/210B represent complex object Web Service function parameters (referred to herein as a 'response object structure') passed to the user system 102 (via the client 202) from the provider system 104 (via the service 204), respectively. More specifically, complex object structure 210B represents the response object prior to a serialization operation performed by the serializer 212 on the provider system 104, while the complex object structure 210A reflects the complex object structure 210B after it has been through a deserialization operation by the deserializer 214 on the user system 102. Additional encoding operations are performed on the serialized payload data as will be described further herein.

With respect to the input function parameters, the interface 110 (114/116) specifies function parameters of the API function call in one or more parts of an input message of a corresponding operation in the WSDL document. Likewise, with respect to the response function parameters, the interface 110 (114/116) specifies the return value of the API function call in one or more parts of a response message of the corresponding operation in the WSDL document. Accordingly, a Web Service is used as a basis for implementing the exemplary API for a high-level programming language between a service application and a client application. Function parameters of an API function call initiated by a client application represent a first complex object structure of the high-level programming language using the exemplary API, as described herein.

Figure 3:
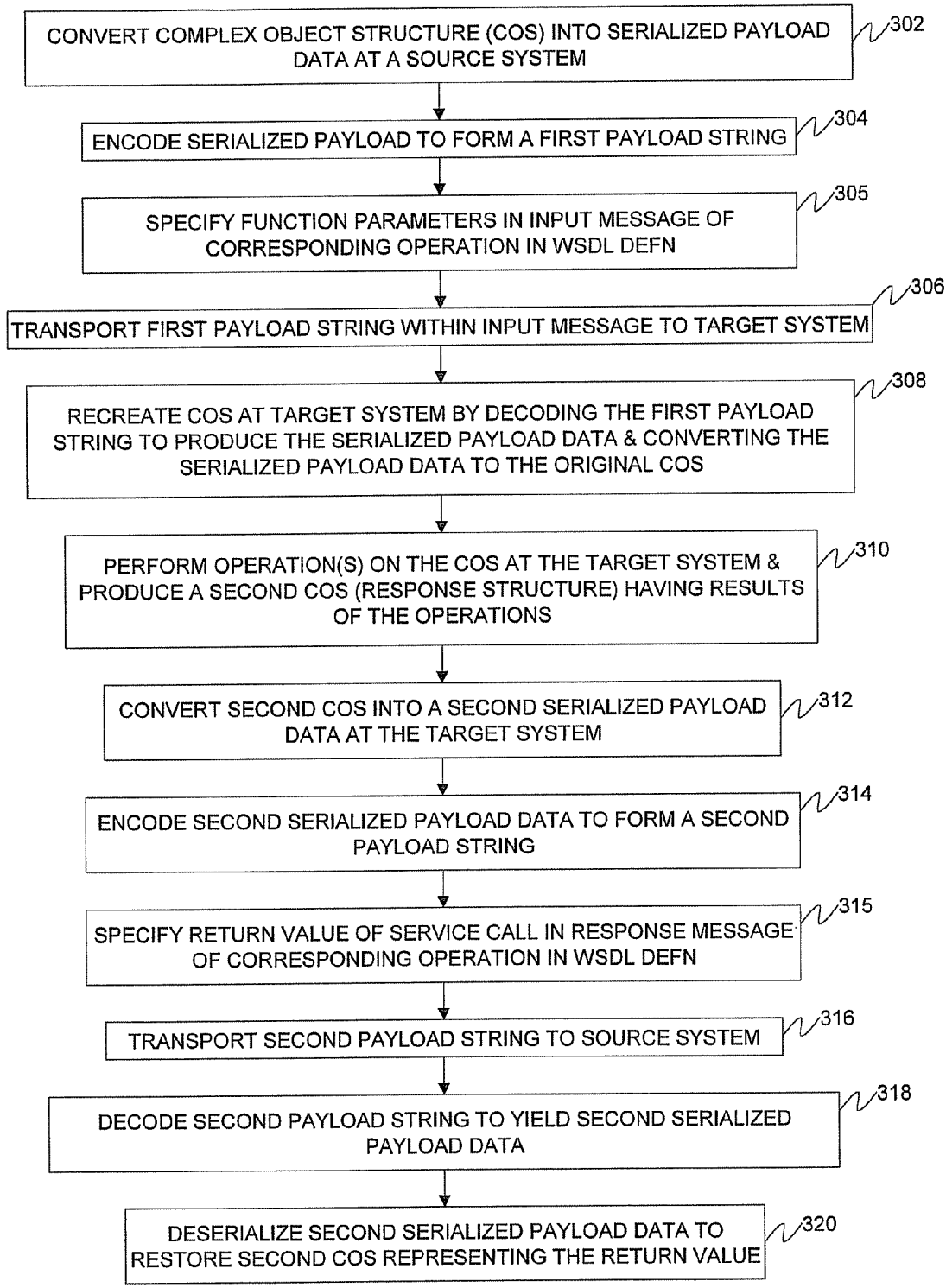
FIG. 3 is a flow diagram describing a process for implementing the Web Service interface processes, including handling complex types, in an exemplary embodiment.

Turning now to FIG. 3, a flow diagram describing a process for implementing the Web Service interface processes will now be described in an exemplary embodiment. The Web Service interface processes transform complex object structures that represent input parameters of a Web Service call (API function call) to simple xsd:string objects, invoke the Web Service operation, and transform its return data from xsd:string type back to the complex object structure that has been built by the service application as the return value of the operation.

For purposes of illustration, a source system is described herein as the client 202 and a target system is described herein as the service 204. However, it will be understood that the service 204 may act as the source system, and the client 202 may act as the target system. At step 302, a source system converts a complex object structure (e.g., complex object structure 206A) into serialized payload data. The complex object structure may include any number of attributes, which in turn may represent any type of nested data object or a simple data type. For example, a complex object structure may be a "department," which contains an attribute "manager" of data type "person," and an attribute "members," which is defined as a list of "person" objects. The data type "person" is again a complex object structure, containing attributes like "home address" (which is again a complex data structure), "salary," and "date of birth." A complex object is then one specific instance of such a complex object structure, with actual values filled in for some or for all of the attributes defined by the complex object structure.

At step 304, the serialized payload data is encoded by the encoder (e.g., encoder 210) to form a payload string that does not contain any XML-specific characters. An example of this encoding operation is shown, as follows:

Sample serialized payload data (note: for simplicity, this example assumes a serialized "Department" object for which all attributes are not set):

```
<?xml version="1.0" encoding="UTF-8"?>
<java version="1.5.0" class="java.beans.XMLDecoder">
  <object class="com.mycomp.Department"/>
</java>
```

The encoding of the serialized payload data may be implemented as a substitution of every XML-specific character with a corresponding control sequence of characters. Alternatively, the encoding of the serialized payload data may be implemented using Base64 encoding. After the encoding step, the resulting payload string is shown, as follows:

<?xml version="1.0" encoding="UTF-8"?> <java version="1.5.0" class="java.beans.XMLDecoder"> <object class="com.mycomp.Department"/> </java>

At step 305, interface 110 specifies the API function as a Web Service operation, whereby the function parameters are specified in one or more parts of an input message of a corresponding operation in the WSDL 114 document. In particular, the Web Service interface 110 (more precisely, the XML schema 116) is defined to expect operation parameters as xsd:string and, therefore, ignores the inner structure of the payload string when it validates the input parameters of the Web Service call (API function call) according to the XML schema 116.

At step 306, the communication means 105/106 transports the payload string within the message parts of the input message (via the interface 110) to the destination address at the target system. The complex object structure is recreated at step 308 by decoding the payload string (via, the decoder 211) to produce the serialized payload data and converting the serialized payload data (e.g., via the deserializer 209) to the original complex object structure (e.g., complex object structure 210B) at the target system. The decoding of the payload string may be implemented as a substitution of the control sequence with the corresponding XML-specific characters. Alternatively, the decoding of the payload string may be implemented using Base64 decoding.

The target system performs one or more operations on the complex object structure 206B as specified by the complex object structure information and produces a second complex object structure (e.g., 210B) that includes the results of the operations at step 310. At step 312, the second complex object structure 210B is converted into a second serialized payload data at the target system (e.g., via serializer 212). The second serialized payload data is then encoded to form a second payload string without containing any XML-specific characters (e.g., using encoder 216) at step 314.

At step 315, the interface 110 specifies the return value of the API function call in one or more parts of a response message of the corresponding operation in the WSDL document 114. In particular, the Web Service interface 110 ignores the inner structure of the second payload string as it validates the return data of the Web Service operation according to the XML schema 116, and the communication means 105/106 transports the second payload string within the response message (via the interface 110) to the source system (e.g., client 202) at step 316.

At step 318, the service application 112 decodes the second payload string to yield the second serialized payload data before deserializing the second serialized payload data to restore the second complex object structure representing the return value at step 320.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for using a Web Service as a basis for implementing an application programming interface (API) for a high-level programming language between a service application and a client application, wherein function parameters of an API function call initiated by the client application represent a first complex object structure of the high-level programming language using the API, the method comprising:
    serializing the first complex object structure by the client application into first serialized payload data;
    encoding the first serialized payload data by the client application to form a first payload string that does not contain any eXtensible Markup Language (XML)-specific characters;
    specifying the API function as a Web Service operation wherein the function parameters are specified in one or more parts of an input message of a corresponding operation in a Web Service Description Language (WSDL) document, wherein types of the input message parts are xsd:string;
    transporting the first payload string within the input message parts of the input message to the service application;
    decoding the first payload string by the service application to yield the first serialized payload data; and
    deserializing the first serialized payload data by the service application to restore the first complex object structure which represents the function parameters of the API function call.

2. The method of claim 1, wherein a return value of the API function call is a second complex object structure of the high-level programming language, the method further comprising:
    serializing the second complex object structure into second serialized payload data by the service application;
    encoding the second serialized payload data by the service application to form a second payload string that does not contain any XML-specific characters;
    specifying the return value of the API function call in one or more parts of a response message of the corresponding operation in the WSDL document, wherein types of the response message parts are xsd:string;
    transporting the second payload string within the response message parts of the response message to the client application;
    decoding the second payload string by the client application to yield the second serialized payload data; and deserializing the second serialized payload data by the client application to restore the second complex object structure which represents the return value of the API function call.

3. The method of claim 1, wherein the first complex object structure that represents the function parameters is a Java Bean object structure, the method comprising:
  using a Java Bean encoder, by the client application, to serialize the Java Beans object structure as the first payload data in the form of XML; and
  using a Java Bean decoder, by the service application to deserialize the first payload data in the XML format to restore the Java Bean object structure that represents the function parameters of the API function call.

4. The method of claim 1, wherein the first serialized payload data is a string.

5. The method of claim 4, wherein:
  the encoding of the first serialized payload data is implemented as substitution of every XML-specific character with a corresponding control sequence of characters; and
  the decoding of the first payload string is implemented as a substitution of the control sequence with the corresponding XML-specific characters.

6. The method of claim 1, wherein:
  the encoding of the first serialized payload data is implemented using Base64 encoding; and
  the decoding of the first payload string is implemented using Base64 decoding.

7. A system for using a Web Service as a basis for implementing an application programming interface (API) for a high-level programming language between a service application and a client application, wherein function parameters of an API function call initiated by the client application represent a first complex object structure of the high-level programming language using the API, the system comprising:
  a client system computer executing the client application; and
  a provider system executing the service application;
  wherein the API is in communication with the client system computer and the provider system; and
  wherein:
  the client application performs:
    serializing the first complex object structure into first serialized payload data; and
    encoding the first serialized payload data to form a first payload string that does not contain any eXtensible Markup Language (XML)-specific characters;
  the API performs:
    specifying the API function as a Web Service operation wherein the function parameters are specified in one or more parts of an input message of a corresponding operation in a Web Service Description Language (WSDL) document, wherein types of the input message parts are xsd:string; and
    transporting the first payload string within the input message parts of the input message to the service application; and
  the service application performs:
    decoding the first payload string to yield the first serialized payload data; and
    deserializing the first serialized payload data to restore the first complex object structure which represents the function parameters of the API function call.

8. The system of claim 7, wherein a return value of the API function call is a second complex object structure of the high-level programming language, the method further comprising:
  serializing the second complex object structure into second serialized payload data by the service application;
  encoding the second serialized payload data by the service application to form a second payload string that does not contain any XML-specific characters;
  specifying the return value of the API function call in one or more parts of a response message of the corresponding operation in the WSDL definition document, wherein types of the response message parts are xsd:string;
  transporting the second payload string within the response message parts of the response message to the client application;
  decoding the second payload string by the client application to yield the second serialized payload data; and
  deserializing the second serialized payload data by the client application to restore the second complex object structure which represents the return value of the API function call.

9. The system of claim 7, wherein the first complex object structure that represents the function parameters is a Java Bean object structure;
  wherein the client application further performs:
    using a Java Bean encoder to serialize the Java Beans object structure as the first payload data in the form of XML; and
  wherein the service application further performs:
    using a Java Bean decoder to deserialize the first payload data in the XML format to restore the Java Bean object structure that represents the function parameters of the API function call.

10. The system of claim 7, wherein the first serialized payload data is a string.

11. The system of claim 10, wherein:
  the encoding of the first serialized payload data is implemented as substitution of every XML-specific character with a corresponding control sequence of characters; and
  the decoding of the first payload string is implemented as a substitution of the control sequence with the corresponding XML-specific characters.

12. The system of claim 7, wherein:
  the encoding of the first serialized payload data is implemented using Base64 encoding; and
  the decoding of the first payload string is implemented using Base64 decoding.

13. A computer program product for using a Web Service as a basis for implementing an application programming interface (API) for a high-level programming language between a service application and a client application, wherein function parameters of an API function call initiated by the client application represent a first complex object structure of the high-level programming language using the API, the computer program product including a non-transitory computer-readable storage medium having program code embodied thereon, the program code implementing a method, the method comprising:
  serializing the first complex object structure by the client application into first serialized payload data;
  encoding the first serialized payload data by the client application to form a first payload string that does not contain any eXtensible Markup Language (XML)-specific characters;

specifying the API function as a Web Service operation wherein the function parameters are specified in one or more parts of an input message of a corresponding operation in a Web Service Description Language (WSDL) document, wherein types of the input message parts are xsd:string;

transporting the first payload string within the input message parts of the input message to the service application;

decoding the first payload string by the service application to yield the first serialized payload data; and deserializing the first serialized payload data by the service application to restore the first complex object structure which represents the function parameters of the API function call.

14. The computer program product of claim 13, wherein a return value of the API function call is a second complex object structure of the high-level programming language, the method further comprising:

serializing the second complex object structure into second serialized payload data by the service application;

encoding the second serialized payload data by the service application to form a second payload string that does not contain any XML-specific characters;

specifying the return value of the API function call in one or more parts of a response message of the corresponding operation in the WSDL document, wherein types of the response message parts are xsd:string;

transporting the second payload string within the response message parts of the response message to the client application;

decoding the second payload string by the client application to yield the second serialized payload data; and deserializing the second serialized payload data by the client application to restore the second complex object structure which represents the return value of the API function call.

15. The computer program product of claim 13, wherein the first complex object structure that represents the function parameters is a Java Bean object structure, the method further comprising:

using a Java Bean encoder, by the client application, to serialize the Java Beans object structure as the first payload data in the form of XML; and using a Java Bean decoder, by the service application to deserialize the first payload data in the XML format to restore the Java Bean object structure that represents the function parameters of the API function call.

16. The computer program product of claim 13, wherein the first serialized payload data is a string.

17. The computer program product of claim 16, wherein:

the encoding of the first serialized payload data is implemented as substitution of every XML-specific character with a corresponding control sequence of characters; and the decoding of the first payload string is implemented as a substitution of the control sequence with the corresponding XML-specific characters.

18. The computer program product of claim 13, wherein:

the encoding of the first serialized payload data is implemented using Base64 encoding; and the decoding of the first payload string is implemented using Base64 decoding.

* * * * *